United States Patent
Freed et al.

(10) Patent No.: US 10,885,270 B2
(45) Date of Patent: Jan. 5, 2021

(54) MACHINE LEARNED DOCUMENT LOSS RECOVERY

(71) Applicant: INTERNATIONAL BUSINESS MACHINES CORPORATION, Armonk, NY (US)

(72) Inventors: Andrew R. Freed, Cary, NC (US); Corville O. Allen, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 15/964,803

(22) Filed: Apr. 27, 2018

(65) Prior Publication Data

US 2019/0332644 A1    Oct. 31, 2019

(51) Int. Cl.
*G06F 40/194* (2020.01)
*G06N 20/00* (2019.01)
(Continued)

(52) U.S. Cl.
CPC ............ *G06F 40/194* (2020.01); *G06F 40/14* (2020.01); *G06F 40/166* (2020.01); *G06N 20/00* (2019.01)

(58) Field of Classification Search
CPC .......... G06F 16/20; G06F 16/30; G06F 17/20; G06F 17/30; G06F 3/04; G06F 40/194;
(Continued)

(56) References Cited

U.S. PATENT DOCUMENTS 6,886,115 B2    4/2005  Kondoh et al.
6,978,275 B2   12/2005  Castellanos et al.
(Continued)

FOREIGN PATENT DOCUMENTS

EP         1729225 A2    12/2006

OTHER PUBLICATIONS

Filippova, et al., "Using Linguistically Motivated Features for Paragraph Boundary Identification," Proceedings of the 2006 Conference on Empirical Methods in Natural Language Processing (EMNLP 2006), pp. 267-274, Sydney, Jul. 2006.
Liu, et al., "Improving the Table Boundary Detection in PDFs by Fixing the Sequence Error of the Sparse Lines," 2009 10th International Conference on Document Analysis and Recognition, IEEE Computer Society, pp. 1006-1010.
(Continued)

*Primary Examiner* — Sanchita Roy
(74) *Attorney, Agent, or Firm* — Conley Rose, P.C.

(57) ABSTRACT

A computer-implemented method includes receiving first lossy converted documents. The computer-implemented method includes generating corrected documents for the first lossy converted documents. Each of the corrected documents includes edit markers that reflect structure changes relative to a corresponding document of the first lossy converted documents. The computer-implemented method includes generating feature vectors for the first lossy converted documents. The feature vectors include structure features of the first lossy converted documents. The computer-implemented method includes training one or more models based on the structure features and the edit markers. The computer-implemented method includes applying the trained one or more models to second lossy converted documents to determine proposed structure edits. The computer-implemented method includes transforming the second lossy converted documents to second corrected documents by applying one or more of the proposed structure edits.

20 Claims, 7 Drawing Sheets

(51) Int. Cl.
*G06F 40/14* (2020.01)
*G06F 40/166* (2020.01)

(58) Field of Classification Search
CPC ...... G06F 40/14; G06F 40/166; G06F 40/232; G06N 20/00; G06N 3/0472; G06N 7/005; G06N 3/0445; G06N 3/0454; G06N 3/084
See application file for complete search history.

(56) References Cited

U.S. PATENT DOCUMENTS

| | | | |
|---|---|---|---|
| 7,251,777 B1 | 7/2007 | Valtchev et al. | |
| 7,392,473 B2 | 6/2008 | Meunier | |
| 2002/0013792 A1* | 1/2002 | Imielinski | G06F 40/14 715/239 |
| 2006/0155530 A1* | 7/2006 | Altevogt | G06F 17/2715 704/9 |
| 2006/0288268 A1 | 12/2006 | Srinivasan et al. | |
| 2007/0130263 A1 | 6/2007 | Li et al. | |
| 2009/0157572 A1* | 6/2009 | Chidlovskii | G06N 20/00 706/12 |
| 2009/0281791 A1* | 11/2009 | Li | G06F 17/2755 704/9 |
| 2015/0026556 A1 | 1/2015 | Stadermann et al. | |
| 2015/0088888 A1 | 3/2015 | Brennan et al. | |
| 2016/0104077 A1 | 4/2016 | Jackson, Jr. et al. | |
| 2018/0039907 A1* | 2/2018 | Kraley | G06K 9/6271 |
| 2019/0005012 A1* | 1/2019 | Priestas | G06N 20/00 |
| 2019/0258854 A1* | 8/2019 | Hosabettu | G06K 9/66 |
| 2020/0151591 A1* | 5/2020 | Li | G06N 5/04 |

OTHER PUBLICATIONS

Read, et al., "Simple and Accountable Segmentation of Marked-up Text," Proceedings of the 19th Nordic Conference of Computational Linguistics (NODALIDA 2013); Linköping Electronic Conference Proceedings #85, 2013, pp. 365-373.

Read, et al., "Sentence Boundary Detection: A Long Solved Problem?," Proceedings of COLING 2012: Posters, pp. 985-994, COLING 2012, Mumbai, Dec. 2012.

Sporleder, et al., "Broad Coverage Paragraph Segmentation Across Languages and Domains," ACM Transactions on Speech and Language Processing, vol. 3, No. 2, Jul. 2006, pp. 1-35.

Zhu, et al., "A Unified Tagging Approach to Text Normalization," ACL 2007, Proceedings of the 45th Annual Meeting of the Association for Computational Linguistics, Jun. 23-30, 2007, Prague, Czech Republic, p. 688-695.

* cited by examiner

| Group # | Line # | 3 | 4 | 5 | 6 | 7 | Line # | 9 | 10 | 11 | 12 | 13 | Line # | 15 | 16 | 17 | 18 | 19 |
|---|---|---|---|---|---|---|---|---|---|---|---|---|---|---|---|---|---|---|
| 0 | 0 | 23 | 1 | 0 | A | B | 1 | 12 | 0 | 1 | C | D | 2 | 9 | 0 | 0 | C | C |
| 1 | 1 | 12 | 0 | 1 | C | D | 2 | 9 | 0 | 0 | C | C | 3 | 12 | 0 | 1 | F | D |

FIG. 4

| Group # | Line # | | | | | | | Line # | | | | | | | Line # | | | | | Edit Markers |
|---|---|---|---|---|---|---|---|---|---|---|---|---|---|---|---|---|---|---|---|---|
| | | 3 | 4 | 5 | 6 | 7 | | 9 | 10 | 11 | 12 | 13 | | 15 | 16 | 17 | 18 | 19 | |
| 0 | 0 | 23 | 1 | 0 | A | B | 1 | 12 | 0 | 1 | C | D | 2 | 9 | 0 | 0 | C | C | 404 |
| 1 | 1 | 12 | 0 | 1 | C | D | 2 | 9 | 0 | 0 | C | C | 3 | 12 | 0 | 1 | F | D | 406 |

MACHINE LEARNED DOCUMENT LOSS RECOVERY

BACKGROUND

Computer systems ingest electronic documents for various purposes, including to train expert systems. The ingested documents may not have originally been digital (e.g., are scanned versions of a printed document) or may be transformed from some other format (e.g., a legacy system), and the formatting of the original document may not be captured in the ingested documents.

SUMMARY

According to an aspect of the present disclosure, a computer-implemented method includes receiving first lossy converted documents. The computer-implemented method includes generating corrected documents for the first lossy converted documents. Each of the corrected documents includes edit markers that reflect structure changes relative to a corresponding document of the first lossy converted documents. The computer-implemented method includes generating feature vectors for the first lossy converted documents. The feature vectors include structure features of the first lossy converted documents. The computer-implemented method includes training one or more models based on the structure features and the edit markers. The computer-implemented method includes applying the trained one or more models to second lossy converted documents to determine proposed structure edits. The computer-implemented method includes transforming the second lossy converted documents to second corrected documents by applying one or more of the proposed structure edits.

According to an aspect of the disclosure, a non-transitory computer readable storage media stores instructions that, when executed by a computer, cause the computer to receive first lossy converted documents. The instructions, when executed, cause the computer to generate corrected documents for the first lossy converted documents. Each of the corrected documents includes edit markers that reflect structure changes relative to a corresponding document of the first lossy converted documents. The instructions, when executed, cause the computer to generate feature vectors for the first lossy converted documents. The feature vectors include structure features of the first lossy converted documents. The instructions, when executed, cause the computer to train one or more models based on the structure features and the edit markers. The instructions, when executed, cause the computer to apply the trained one or more models to second lossy converted documents to determine proposed structure edits. The instructions, when executed, cause the computer to transform the second lossy converted documents to second corrected documents by applying one or more of the proposed structure edits.

According to an aspect of the disclosure, a computer system includes memory storing program instructions. The computer system additionally includes a processor coupled to the memory and configured to execute the program instructions stored on the memory to cause the processor to receive first lossy converted documents. The program instructions cause the processor to generate corrected documents for the first lossy converted documents. Each of the corrected documents includes edit markers that reflect structure changes relative to a corresponding document of the first lossy converted documents. The program instructions cause the computer to generate feature vectors for the first lossy converted documents. The feature vectors include structure features of the first lossy converted documents. The program instructions cause the computer to train one or more models based on the structure features and the edit markers. The program instructions cause the computer to apply the trained one or more models to second lossy converted documents to determine proposed structure edits. The program instructions cause the computer to transform the second lossy converted documents to second corrected documents by applying one or more of the proposed structure edits.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an" and "the" are intended to include the plural forms as well, unless the context clearly indicates otherwise.

An engine as referenced herein may comprise software components such as, but not limited to, computer-executable instructions, data access objects, service components, user interface components, application programming interface (API) components; hardware components such as electrical circuitry, processors, and memory; and/or a combination thereof. The memory may be volatile memory or non-volatile memory that stores data and computer executable instructions. The computer-executable instructions may be in any form including, but not limited to, machine code, assembly code, and high-level programming code written in any programming language. The engine may be configured to use the data to execute one or more instructions to perform one or more tasks.

Embodiments of the disclosure include a system that trains one or more machine learning models using training documents and uses the one or more trained models to determine document edits to apply to run-time documents. The training documents and the run-time documents are structured documents and are converted or transformed versions of original or preceding versions of the training or run-time documents. Structured documents are electronic documents in which some method of embedded coding, such as mark-up, is used to give the documents various structural meanings according to a schema. The edit markers are corrections to the training documents as determined by a user. The system applies one or more of the document edits to one or more of the run-time documents to generate corrected documents that recover structure of an original or preceding version of the run-time document. The corrected documents are typically better suited for natural language processing and contextual processing than the run-time documents because the corrected documents more accurately represent the structure of the original document than the run-time documents.

Figure 1:
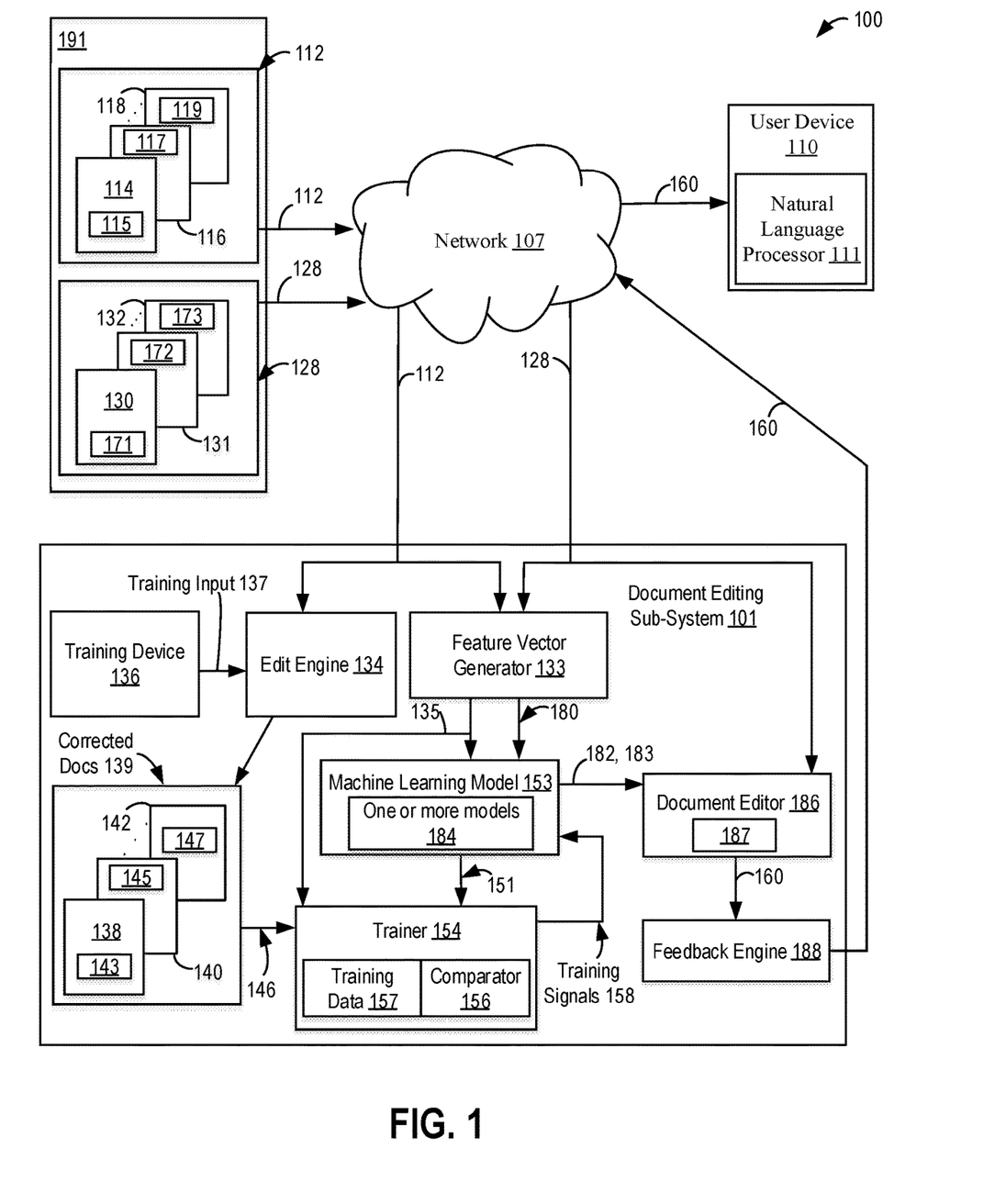
FIG. 1 is a block diagram view of an embodiment of a system according to the present disclosure.

FIG. 1 illustrates an example of a system 100 configured to transform lossy converted documents to corrected documents by training one or more models to predict structure edits, using the trained one or more models to predict structure edits, and making structure edits predicted by the trained one or more models to recover structure in an original document. The system 100 includes a document editing sub-system 101. The document editing sub-system 101 is configured to receive first lossy converted documents 112. The first lossy converted documents 112 are converted or transformed versions of original or preceding documents. For example, the original or preceding documents may correspond to first digital documents (e.g., PDFs) resulting from scanning printed documents. In this example, the first lossy converted documents 112 may correspond to second digital documents resulting from performing optical character recognition on the first digital documents. As another example, the original or preceding documents may correspond to digital documents in a first format (e.g., from a legacy system). In this example, the first lossy converted documents 112 may correspond to digital documents in a second format (e.g., different than the first format). For example, the first lossy converted documents 112 may be generated by transforming a digital document in a first format (e.g., a format of an older system) to a digital document in a second format (e.g., a format of a newer system).

The first lossy converted documents 112 are structured documents. Structured documents are electronic documents in which some method of embedded coding, such as mark-up, is used to give the documents various structural meanings according to a schema. In some examples, the mark-up language is hypertext markup language (HTML). In these examples, the original documents (e.g., PDFs) are converted to the first lossy converted documents 112 using an HTML converter.

Figure 2:
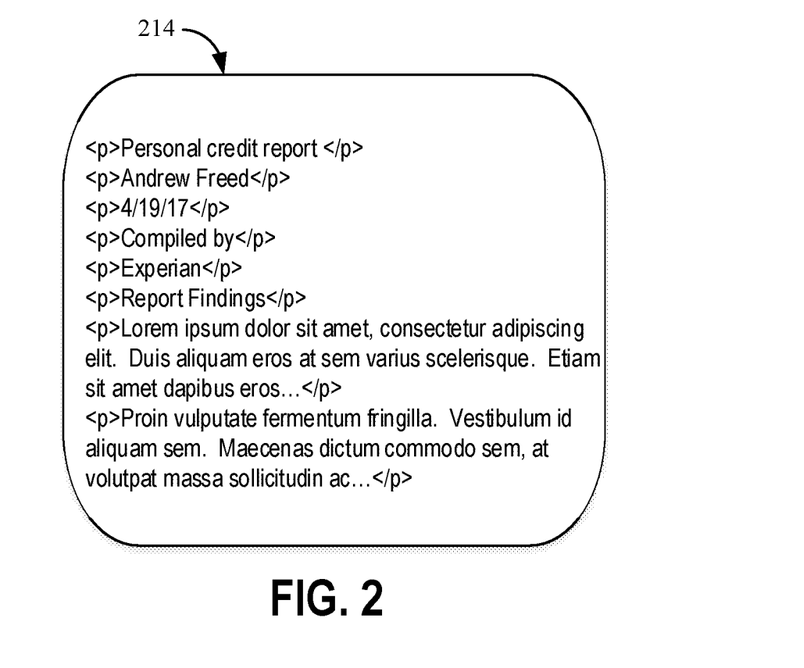
FIG. 2 is an example of a lossy converted document according to the present disclosure.

In the example illustrated in FIG. 1, the first lossy converted documents 112 include a first document 114 that includes first document structure 115, a second document 116 that includes second document structure 117, and an Nth document 118 that includes Nth document structure 119. The document structure of each of the first lossy converted documents 112 may include any form of structure or formatting, including line breaks, paragraph breaks, section headers, punctuation, or content structure. For example, FIG. 2 illustrates an example of a lossy converted document 214. The lossy converted document 214 of FIG. 2 may correspond to the first document 114, the second document 116, or the Nth document 118 of FIG. 1. The lossy converted document 214 includes structure as indicated by paragraph break structure markers (e.g., <p> and </p>). However, in other examples, the first lossy converted documents 112 may include mark-up that imparts structural meaning other than paragraphs.

The first lossy converted documents 112 may be stored in a document repository 191. The document repository 191 may correspond to a storage system or device configured to store documents. In some examples, the document repository 191 includes one or more servers, and the document editing sub-system 101 receives the first lossy converted documents 112 from the document repository 191 via a network 107 (e.g., a wired or wireless network).

The document editing sub-system 101 further includes an edit engine 134 configured to receive the first lossy converted documents 112 and training input 137. The training input 137 may be received from a training device 136. For example, an operator of the training device 136 may provide input to the training device 136 via a user interface, and the training input 137 provided to the edit engine 134 may reflect the input provided by the operator of the training device 136. The training input 137 may identify changes to structure of the first lossy converted documents 112. As examples, the training input 137 may identify that one or more line breaks should be added, that one or more line breaks should be removed, that one or more paragraph breaks should be added, that one or more paragraph breaks should be removed, that one or more section headers should be added, or that one or more punctuations should be added.

The edit engine 134 may generate corrected documents 139 based on the first lossy converted documents 112 and the training input 137. Each of the corrected documents 139 includes edit markers 146 that reflect changes (indicated by the training input 137) relative to a corresponding document of the first lossy converted documents 112. In the example illustrated in FIG. 1, the corrected documents 139 include a first corrected document 138 including first edit markers 143 reflecting the changes to the first document 114 indicated by the training input 137. Additionally or alternatively, the corrected documents 139 may include a second corrected document 140 including second edit markers 145 reflecting the changes to the second document 116 indicated by the training input 137. Additionally or alternatively, the corrected documents 139 may include an Nth corrected document 142 including Nth edit markers 147 reflecting the changes to the Nth document 118 indicated by the training input 137.

Figure 3:
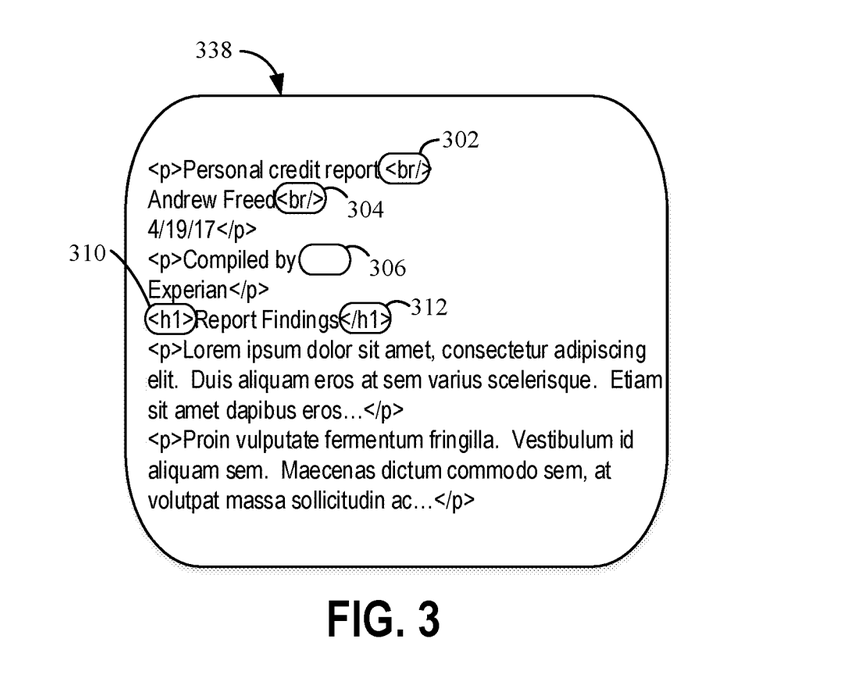
FIG. 3 is an example of a corrected document including examples of edit markers according to the present disclosure.

FIG. 3 illustrates an example of a corrected document 338 including edit markers 302, 304, 306, 310, and 312. The corrected document 338 may be generated based on the lossy converted document 214 of FIG. 2, and may correspond to the first corrected document 138, the second corrected document 140, or the Nth corrected document 142 of FIG. 1. In the example illustrated using FIG. 3, the training input 137 in FIG. 1 may identify a first change from a paragraph break after the first line of the lossy converted document 214 of FIG. 2 to a line break, and the edit marker 302 of FIG. 3 may reflect the first change from the paragraph break to the line break. The training input 137 of FIG. 1 may further identify a second change from a paragraph break after the second line of the lossy converted document 214 of FIG. 2 to a line break, and the edit marker 304 of FIG. 3 may reflect the second change from the paragraph break to the line break. The training input 137 of FIG. 1 may further identify a third change that removes a paragraph break after the fourth line of the lossy converted document 214 of FIG. 2, and the edit marker 306 of FIG. 3 may reflect the third change. The training input 137 of FIG. 1 may further identify a fourth change that identifies the sixth line as a section header, and edit markers 310, 312 of FIG. 3 may reflect the fourth change.

Returning to FIG. 1, the document editing sub-system 101 further includes a feature vector generator 133 configured to generate one or more feature vectors 135 for the first lossy converted documents 112. The one or more feature vectors 135 include structure features of the first lossy converted documents 112. The structure features may reflect properties or attributes of portions of the first lossy converted documents 112. For example, the properties or attributes of a line of text in a document of the first lossy converted documents 112 may include a length of the line of text (e.g., a number of characters and spaces in the line of text), a number of line breaks before and/or after the line of text, content of text in the line of text, line number in the originating document, sentence structure of the line of text, or features from one or more preceding lines of text. The content of text in the line of text may include domain types in the line of text and/or data types in the line of text. Examples of domains include a medical domain and a financial domain. Examples of medical domain types include medication, diagnosis, or allergies. Examples of data types include string, numeric, currency, or date.

The document editing sub-system 101 includes a machine learning model 153 configured to determine proposed edits 151 for the first lossy converted documents 112 by applying one or more models 184 to the one or more feature vectors 135 as described in more detail below. In some examples, the machine learning model 153 may employ multiple models as described in more detail below. In these examples, the feature vector generator 133 may generate multiple feature vectors for a given document of the first lossy converted documents 112, and each of the multiple feature vectors may correspond to a respective model of the multiple models. For example, the one or more feature vectors 135 for a given first lossy converted document 112 may include first feature vectors for a first model (e.g., a single line model), second feature vectors for a second model (e.g., a multi-line model), and third feature vectors for a third model (e.g., a content model).

A single line model may use feature vectors 135 that treat each line in a document individually. Table 1 illustrates an example of feature vectors 135 for a single line model using the lossy converted document 214 of FIG. 2 as an example. The first column in Table 1 identifies the line number, the second through sixth columns in each row in Table 1 may correspond to structure features of a feature vector for the single line model. For example, a first feature vector for the first line (line #0) may include structure features indicating a length of 23 characters/spaces, a domain type corresponding to domain type 1 (e.g., corresponding to a domain type of "personal credit report"), a data type corresponding to data type 0 (e.g., a data type corresponding to an "undetermined" data type, or not applicable), a first word class corresponding to word class A, and a last word class corresponding to word class B. As another example, a second feature vector for the second line (line #1) may include structure features indicating a length of twelve characters/spaces, a domain type corresponding to domain type 0 (e.g., corresponding to an "undetermined" domain type), a data type corresponding to data type 1 (e.g., corresponding to a data type of "Capitalized string"), a first word class corresponding to word class C, and a last word class corresponding to word class D. As another example, a third feature vector for the third line (line #2) may include structure features indicating a length of nine characters/spaces, a domain type corresponding to domain type 0 (e.g., corresponding to an "undetermined" domain type), a data type corresponding to data type 1 (e.g., corresponding to an "undetermined" data type), a first word class corresponding to word class C, and a last word class corresponding to word class C.

TABLE 1

| Line # | Length | Domain Type | Data Type | FirstWordClass | LastWordClass |
|---|---|---|---|---|---|
| 0 | 23 | 1 | 0 | A | B |
| 1 | 12 | 0 | 1 | C | D |
| 2 | 9 | 0 | 0 | C | C |

Figure 4:
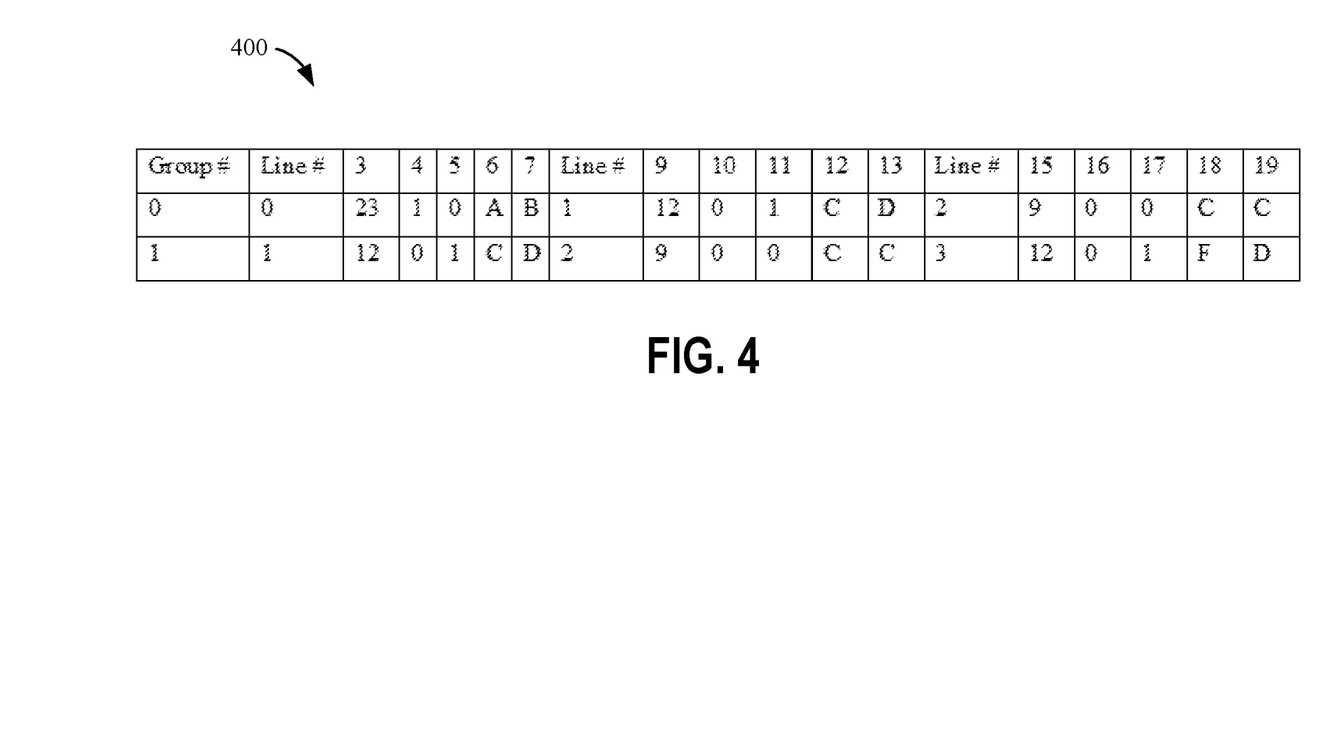
FIG. 4 is a Table illustrating examples of structure features used in example feature vectors for an example of a multi-line model.

A multi-line model may use feature vectors 135 that include structure features for multiple lines in a document. The table 400 in FIG. 4 illustrates an example of structure features for a three-line model using the lossy converted document 214 of FIG. 2 as an example. In this example, the first row of the table 400 includes structure features for the first three lines of the lossy converted document 214 of FIG. 2, and a first feature vector for the three-line model may include structure features from columns 1 through 19 of the first row of the table in FIG. 4. As another example, the second row of the table 400 includes structure features for the second, third, and fourth lines of the lossy converted document 214 of FIG. 2, and a second feature vector for the three-line model may include structure features from columns 1 through 19 in the second row of the table 400.

In the example illustrated in FIG. 4, the first column in the table 400 identifies a group number, the second column stores a line number associated with data in the third through seventh columns, the eighth column stores a line number associated with data in the ninth through thirteenth columns, and the fourteenth column stores a line number associated with data in the fifteenth through nineteenth columns.

In the table 400 illustrated in FIG. 4, the third, ninth, and fifteenth columns may store a length of an associated line of text. To illustrate, the third column may store a value that indicates the first line is 23 characters long, the ninth column may store a value that indicates that the second line is 12 characters long, and the fifteenth column may store a value that indicates that the third line is nine characters long. Additionally or alternatively, the fourth, tenth, and sixteenth columns may store an indicator of a domain type of an associated line. To illustrate, the fourth column may indicate that a domain type of the first line (line #0) corresponds to a "personal credit report" domain, and the tenth and sixteenth columns may indicate that a domain type of the second and third lines (line #1 and line #2), respectively, are not determined. Additionally or alternatively, the fifth, eleventh, and seventeenth columns may store an indicator of a data type of an associated line. For example, the fifth column may indicate that a data type of the first line (line #0) is not determined, and the eleventh and seventeenth columns may indicate that a data type of the second line (line #1) and the third line (line #2) are "Capitalized string" and "Date", respectively. Additionally or alternatively, the sixth, twelfth, and eighteenth columns may store an indicator of a class of a first word in an associated line. For example, the sixth, twelfth, and eighteenth columns may indicate that the first word in the first line (line #0) corresponds to class A, and that the first words in the second and third lines (line #1 and line #2) correspond to class C. Additionally or alternatively, the seventh, thirteenth, and nineteenth columns may store an indicator of a class of a last word in an associated line. For example, the seventh, thirteenth, and nineteenth columns may indicate that the last word in the first line (line #0) corresponds to class B, that the last word in the second line (line #1) corresponds to class C, and that the last word in the third line (line #2) corresponds to class C.

A content model may use feature vectors 135 that include features from multiple lines in a document. A content model uses headers, relationships, and entity types found on multiple lines to learn the structure and content of a document. Table 2 illustrates an example of structure features for a content model using the lossy converted document 214 of FIG. 2 as an example.

TABLE 2

| Line # | Content Type | Category | Entity Type | Relationship |
| --- | --- | --- | --- | --- |
| 0 | Header | Credit Report | Report | None |
| 1 | String | Person | Named Entity | for (Report) |
| 2 | Date | Date | Date (MM/DD/YY) | for(Report) |
| 3 | String | Text | None | None |
| 4 | String | Company | Named Entity | own(Report) |
| 5 | Header | Report Finding | Finding | for(Report) |

For example, on line #2 the date typically has a format of MM/DD/YY, where if one of the "/" slash is missing in a document conversion or scan for that line, it can be corrected for the report, provided that a Header, Named Entity precedes it in the document structure. Similarly, the document correction (edit marker) is performed to combine line #3 and line #4 for training the relationship for line 4 to determine who owns the report if the reports are given by different companies. The entire feature vectors, their line placement, and entity types can be utilized in the training model to determine the correct document correction for the second corrected document.

The machine learning model 153 is configured to receive the one or more feature vectors 135 from the feature vector generator 133 and determine proposed edits 151 for the first lossy converted documents 112 for each of the one or more models 184. The machine learning model 153 may be implemented as a Bayesian model, a clustering model (e.g., k-means), an artificial neural network (e.g., perceptron, back-propagation, hopfield, radial basis function network), a deep learning network (e.g., deep boltzmann machine, deep belief network, convolutional neural network), and may be trained using training data (e.g., a training signal 158) from a trainer 154 as described in more detail below. The proposed edits 151 may correspond to the types of changes indicated by the training data 157. For example, the proposed edits 151 may propose adding one or more line breaks, removing one or more line breaks, adding one or more section headers, or adding one or more punctuations.

In an example, the one or more models 184 include the single line model described above. The single line model determines proposed edits 151 for each of the first lossy converted documents 112 based on feature vectors 135 that include structure features from a single line in the first lossy converted document. For example with reference to the lossy converted document 214 of FIG. 2 and the features in Table 1, the machine learning model 153 may output a first proposed edit 151 for the first line (line #0) that represents a change from paragraph break to line break based on the structure features in the second through sixth columns of the first row of Table 1. As another example, the machine learning model 153 may output a second proposed edit 151 for the second line (line #1) that represents a change from paragraph break to line break based on the structure features in the second through sixth columns of the second row of Table 1. As another example, the machine learning model 153 may output a third proposed edit 151 for the third line (line #2) that represents a change from paragraph break to line break based on the structure features in the second through sixth columns of the third row of Table 1.

The one or more models 184 may additionally or alternatively include the multi-line model. For example, the one or more models 184 may include the three-line model described above. The multi-line model determines proposed edits 151 for each of the first lossy converted documents 112 by evaluating multiple lines in the lossy document over a sliding window of the multiple lines. For example with reference to the lossy converted document 214 of FIG. 2 and the structure features in the table in FIG. 3, the machine learning model 153 may determine and output first proposed edits (of the proposed edits 151) for the first group (group #0) of lines (lines #0, #1, and #2) based on the example of the first feature vector described above with reference to the table in FIG. 3. The first proposed edits to the first group of lines may indicate no change to the first group of lines. As another example, the machine learning model 153 may determine and output second proposed edits (of the proposed edits 151) for the second group (group #1) of lines (lines #1, #2, and #3) based on the example of the second feature vector described above with reference to the table in FIG. 3. The second proposed edits to the second group of lines may indicate no changes to the second group of lines.

The one or more models 184 may additionally or alternatively include the content model. The content model determines proposed edits 151 for each of the first lossy converted documents 112 by evaluating multiple lines in the first lossy converted documents 112 to identify content of the first lossy converted documents 112. For example, the content model may evaluate feature from multiple lines to determine proposed edits 151 for the lossy converted document 214 of FIG. 2 that correspond to a credit statement section from line 7 to line 12.

The document editing sub-system 101 includes a trainer 154 configured to train one or more models 184 based on the structure features (e.g., in the feature vectors 135) and the edit markers 146. The trainer 154 may generate one or more training signals 158 to train the machine learning model 153. The one or more training signals 158 may include a training signal for each of the one or more models 184 of the machine learning model 153. For example, the one or more training signals 158 may include a first training signal to train a single line model, a second training signal to train a multi-line model, and a third training signal to train a content model.

The trainer 154 may generate the one or more training signals 158 using a comparator 156 to compare training data 157 to the proposed edits 151. For example, the trainer 154 may receive feature vectors (of the one or more feature vectors 135) corresponding to a given lossy converted document (of the first lossy converted documents 112), may receive edit markers 146 corresponding to the given lossy converted document, and may determine training data 157 based on the feature vectors and edit markers corresponding to the given lossy converted document. The comparator 156 may compare the edit markers 146 in the training data 157 to respective edits of the proposed edits 151 determined by the machine learning model 153 to determine the one or more training signals 158.

As an example, Table 3 illustrates an example of the training data 157 for the lossy converted document 214 of FIG. 2 and a single line model.

TABLE 3

| Line # | Length | Domain Type | Data Type | FirstWordClass | LastWordClass | Edit Marker |
|---|---|---|---|---|---|---|
| 0 | 23 | 1 | 0 | A | B | P->BR |
| 1 | 12 | 0 | 1 | C | D | P->BR |
| 2 | 9 | 0 | 0 | C | C | P->BR |

In this example, the comparator 156 compares the edit marker 146 in the training data 157 for the first line (line #0) that indicates a change from paragraph break to line break to the proposed edit 151 for the first line that indicates no change to first line. In this example, the comparator 156 determines that the proposed edit 151 for the first line is different from the edit marker in the training data 157 for the first line, and the trainer 154 may determine one of the one or more training signals 158 based on the difference between the edit marker 146 and the proposed edit 151 for the first line. As another example, the comparator 156 compares the edit marker 146 in the training data 157 for the second line (line #1) that indicates a change from paragraph break to line break to the proposed edit 151 for the second line that indicates no change to the second line. In this example, the comparator 156 determines that the proposed edit 151 for the second line is different from the edit marker in the training data 157 for the second line, and the trainer 154 may determine one of the one or more training signals 158 based on the difference between the edit marker 146 and the proposed edit 151 for the second line. As another example, the comparator 156 compares the edit marker 146 in the training data 157 for the third line (line #2) that indicates a change from paragraph break to line break to the proposed edit 151 for line 2 that indicates no change to the third line. In this example, the comparator 156 determines that the proposed edit 151 for the third line is different from the edit marker in the training data 157 for the third line, and the trainer 154 may determine one of the one or more training signals 158 based on the difference between the edit marker 146 and the proposed edit 151 for the third line.

Figure 5:
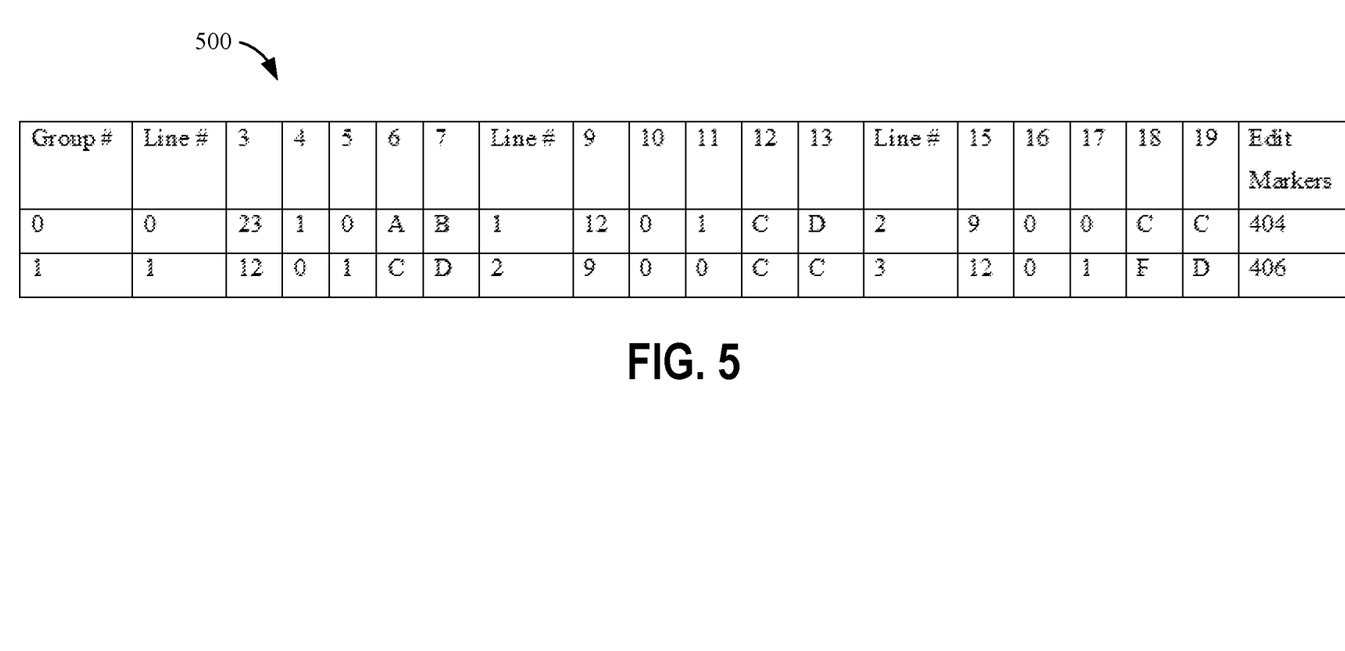
FIG. 5 is a Table illustrating an example of training data for an example of a multi-line model.

As another example, the table 500 in FIG. 5 illustrates an example of the training data 157 for the lossy converted document 214 of FIG. 2 and a multi-line model. In this example, the comparator 156 compares edit markers 404 in the training data 157 for the first group (group #0) of lines (lines #0, #1, and #2) that indicate a change from paragraph break to line break for each of the first three lines of the lossy converted document 214 of FIG. 2 to the first proposed edits (of the proposed edits 151) for the first group of lines that indicate no change to the first group of lines. In this example, the comparator 156 determines that the first proposed edits for the first group of lines are different from the edit markers 404 in the training data 157 for the first group of lines, and the trainer 154 may determine one of the one or more training signals 158 based on the difference between the edit markers 404 for the first group of lines and the first proposed edits for the first group of lines. Likewise, the comparator 156 compares edit markers 406 in the training data 157 for the second group (group #1) to the first proposed edits (of the proposed edits 151) for the second group to determine another of the one or more training signals 158.

In some examples, the machine learning model 153 is a neural network, and the trainer 154 may employ a backpropagation algorithm that includes a forward pass through the neural network and a backward pass through the neural network. For example, in the forward pass, the outputs (e.g., the proposed edits 151) of the machine learning model 153 corresponding to given inputs (e.g., feature vectors 135) are evaluated by comparing the proposed edits 151 to the edit markers 146 (e.g., using a loss function). The resulting error value is calculated for each of the neurons in the output layer. The error values are then propagated from the output back through the neural network, until each neuron has an associated error value that reflects its contribution to the original output. The error values are used to calculate the gradient of the loss function. In the second phase, this gradient is fed to an optimization method, which in turn uses it to update the weights of the neurons, in an attempt to minimize the loss function. In this manner, the trainer 154 may train the one or more models 184 to recognize or predict correct structure edits or content identification of run-time documents.

Figure 6:
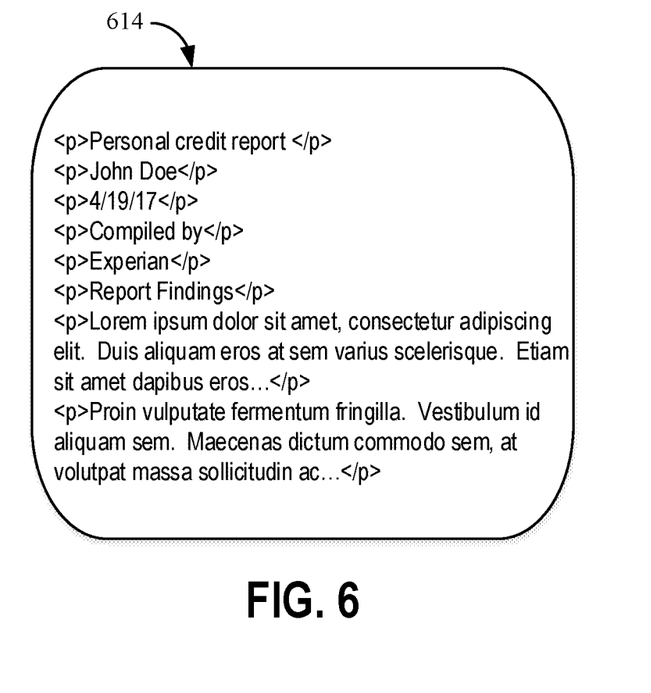
FIG. 6 is an example of a lossy converted document according to the present disclosure.

During run-time (e.g., once sufficiently trained by the trainer 154), the document editing sub-system 101 is configured to receive second lossy converted documents 128. The document editing sub-system 101 may receive the second lossy converted documents 128 from the document repository 191 via the network 107. The second lossy converted documents 128 are converted or transformed versions of second original documents, are structured documents, and may be generated as described above with reference to the first lossy converted documents 112. In the example illustrated in FIG. 1, the second lossy converted documents 128 include a first document 130 that includes first document structure 171, a second document 131 that includes second document structure 172, and an Nth document 132 that includes Nth document structure 173. The document structure of each of the second lossy converted documents 128 may include any form of structure or formatting, including line breaks, paragraph breaks, section headers, punctuation, or content structure. FIG. 6 illustrates an example of a lossy converted document 614. The lossy converted document 614 of FIG. 6 may correspond to any of the second lossy converted documents 128 of FIG. 1. The lossy converted document 614 of FIG. 6 includes structure as indicated by paragraph break structure markers (e.g., <p> and </p>).

The feature vector generator 133 may receive the second lossy converted documents 128 from the document repository 191 and generate one or more run-time feature vectors 180. The one or more run-time feature vectors 180 may be generated as described above with reference to the one or more feature vectors 135. In examples in which the machine learning model 153 includes multiple models, the one or more run-time feature vectors 180 may include different types of feature vectors for each of the multiple models. For example, when the multiple models include a single line model, the one or more run-time feature vectors 180 may include feature vectors that include features as described above with reference to Table 1. As another example, when the multiple models include a multi-line model, the one or more run-time feature vectors 180 may include feature vectors that include features as described above with reference to the table in FIG. 4. As another example, when the multiple models include a content model, the one or more run-time feature vectors 180 may include feature vectors that include features as described above with reference to Table 2.

The machine learning model 153 is configured to apply the one or more models 184 (trained as described above) to the one or more run-time feature vectors 180 to determine proposed structure edits 182. To illustrate using the lossy converted document 614 of FIG. 6 as an example, the trained single-line model may determine that the first three paragraphs are not paragraphs due to being too short and containing few tokens/types. In this example, the trained single line model may output proposed structure edits 182 that propose changing the paragraph breaks for the first and second lines to line breaks. As another example, the trained multi-line model may determine that the first, second, and third lines correspond to a single paragraph based on the group of lines beginning with the domain type "personal credit report" and ending with the data type "date". In this example, the trained multi-line model may output proposed structure edits 182 that propose removing the paragraph breaks after the first two lines and keeping the paragraph break after the third line. As another example, the content model may identify the content structure as an identification part of the credit report and statement part of the credit report by utilizing a sentence parser to determine relationships and be provided hints based on adjacent lines for a relationship. An entity resolution parser can determine categories, entity types, and entities defined in the text. Parsing of texts and determining formats and text formats can be included in the content model for a line and the relationships to other entities or entities by an ontology or relationship mapping table. In this example, the content model may output proposed structure edits 182 that propose adding markers identifying content types. As another example, the trained single line model may determine that the sixth line is not part of a paragraph due to being too short and containing too few tokens/types, and may determine that the seventh and eighth lines are part of a paragraph. In this example, the single line model may output proposed structure edits 182 that propose removing the paragraph markers before and after "Report Findings". The multi-line model may determine that line six is a header based on line 6 being the last short line preceding a paragraph. In this example, the multi-line model may output proposed structure edits 182 that propose adding one or more markers indicating that line six is a header.

The machine learning model 153 may additionally determine confidence values 183 for each of the proposed structure edits 182. The confidence values may be determined using any technique.

The system 100 may include a document editor 186 configured to receive the second lossy converted documents 128 and the proposed structure edits 182. The document editor 186 is configured to determine, for each of the proposed structure edits 182, whether to apply the proposed structure edit. The proposed structure edits 182 that the document editor 186 determines to apply may be referred to herein as applicable structure edits 187.

In some examples, the document editor 186 is configured to consider proposed structure edits 182 from each of the multiple models to determine whether to apply a proposed structure edit 182. For example, multiple models of the machine learning model 153 may output respective proposed edits for a first line in a first of the second lossy converted documents 128, and the document editor 186 may consider the respective proposed edits for the first line in the first of the second lossy converted documents 128 from the multiple models in conjunction in order to determine whether to apply a proposed edit to the first line in the first of the second lossy converted documents 128. For example, the document editor 186 may combine confidence values 183 for proposed edits from each of the multiple models and determine to apply a proposed edit of one or more of the multiple models when the combined confidence value satisfies a threshold.

To illustrate using the above examples of the multiple models, the single-line model may output a first proposed structure edit (of the proposed structure edits 182) for the first line in the first of the second lossy converted documents 128 that represents a change from paragraph break to line break. The machine learning model 153 may additionally output a first confidence value (of the confidence values 183) associated with the first proposed structure edit. Additionally or alternatively, the multi-line model may output a second proposed structure edit (of the proposed structure edits 182) for the first line in the first of the second lossy converted documents 128 that represents a change from paragraph break to line break. The machine learning model 153 may additionally output a second confidence value (of the confidence values 183) associated with the second proposed structure edit. The document editor 186 may sum the first confidence value and the second confidence value to determine a combined confidence value for the proposed structure edits 182 from the single-line model and the multi-line model. The document editor 186 may compare the combined confidence value to a threshold to determine whether the combined confidence value satisfies (e.g., exceeds) the threshold. When the combined confidence value satisfies the threshold, the document editor 186 may determine to apply the first and second proposed structure edits (e.g., may determine that the first and second proposed structure edits are applicable structure edits 187).

The document editor 186 is configured to transform the second lossy converted documents 128 to second corrected documents 160 by applying one or more of the proposed structure edits 182 (e.g., by applying the applicable structure edits 187) to the second lossy converted documents 128. The second corrected documents 160 are typically better suited for natural language processing and contextual processing than the second lossy converted documents 128 because the second corrected documents 160 more accurately represent the structure of the original document than the second lossy converted documents 128.

Figure 7:
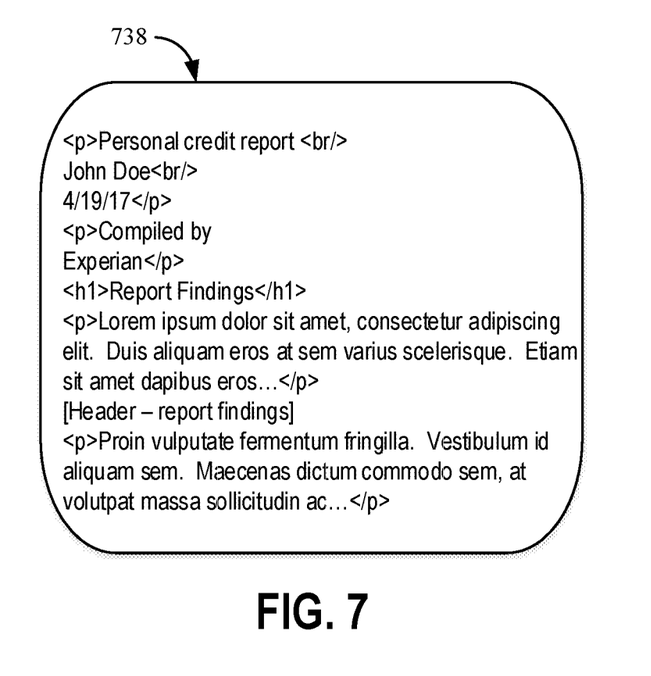
FIG. 7 is an example of a corrected document according to the present disclosure.

In some examples, the second corrected documents 160 include structure markers that cause a device that processes the second corrected documents 160 to recognize the structure indicated by the structure markers. For example, corrected document 738 of FIG. 7 is an example of a second corrected document 160 generated by the machine learning model 153 based on the lossy converted document 614 of FIG. 6. In this example, the corrected document 738 of FIG. 7 includes markers for the proposed structure edits 182 described above with reference to FIG. 6. The corrected document 738 of FIG. 7 additionally includes a marker that indicates that the paragraph beginning with "Proin" also falls under the header "Report Findings".

Additionally or alternatively, the second corrected documents 160 may be generated using a target format other than plain text. For example, the second corrected documents 160 may include javascript object notation (JSON) payloads with different sections. In an example, the second corrected documents 160 may include a second corrected document with three sections—header, paragraph text, and content context. To illustrate using the lossy converted document 614 of FIG. 6 as an example, the second corrected documents 160 may include the following payloads:

```
{"header":"Personal credit report",
"paragraph_text": "John Doe/n4/19/17/nCompiled by/nExperian",
"content_context": "identification"}
{"header":"Personal credit report",
"line_text": "Personal credit report",
"content_context": "identification", "Report"}
{"header":"Personal credit report",
"paragraph_text": "John Doe/n4/19/17/nCompiled by/nExperian",
"content_context": "Person-for(Report), Date (MM/DD/YY),
Company-owns(Report)"}
{"header":"Report Findings",
"paragraph_text": "Lorem ipsum...",
"content_context": "statement"}
{"header":"Report Findings",
"paragraph_text": "Proin vulputate...",
"content_context": "statement"}
```

The document editing sub-system 101 may include a feedback engine 188 configured to send the second corrected documents 160 to a user device 110 that includes a natural language processor 111. The natural language processor 111 may process the second corrected documents 160. In this manner, the system 100 is configured to determine structure changes to apply to a document and apply the changes to the document to generate a document that recovers structure in the original document.

Figure 8:
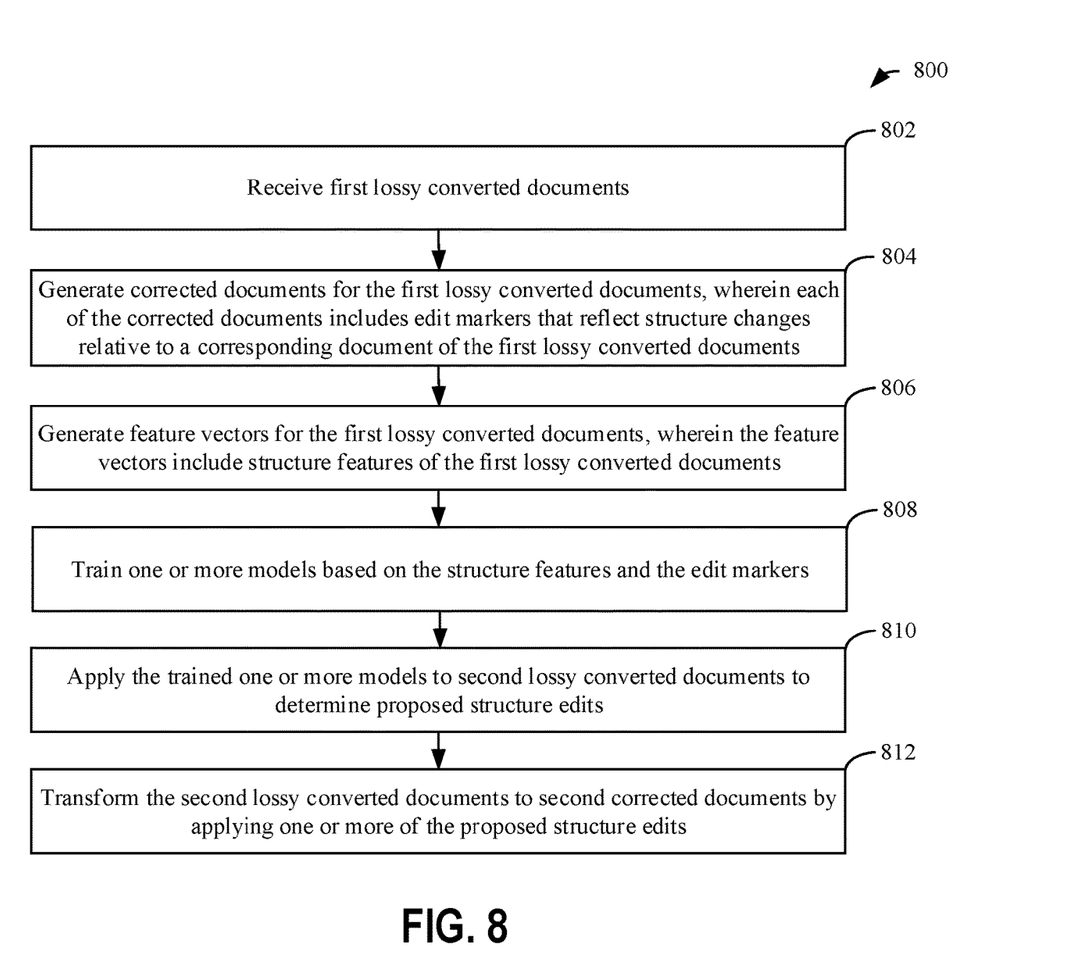
FIG. 8 is a flowchart of a computer-implemented method according to the present disclosure.

FIG. 8 is a flowchart of a computer-implemented method 800 to generate a document that recovers structure from an original version of the document. The computer-implemented method 800 may be performed by one or more components of the system 100 of FIG. 1. In an example, the computer-implemented method 800 is performed by the document editing sub-system 101 of FIG. 1.

The computer-implemented method 800 includes receiving, at 802, first lossy converted documents. For example, the first lossy converted documents may correspond to the first lossy converted documents 112 of FIG. 1, and the document editing sub-system 101 of FIG. 1 may receive the first lossy converted documents.

The computer-implemented method 800 includes generating, at 804, corrected documents for the first lossy converted documents. Each of the corrected documents includes edit markers that reflect structure changes relative to a corresponding document of the first lossy converted documents. For example, the corrected documents may correspond to the corrected documents 139 described above with reference to FIG. 1, and the corrected documents may be generated by the edit engine 134 of FIG. 1 as described above with reference to FIG. 1. In some examples, the edit markers include at least one of a line break being added, a line break being removed, a section header being added, or one or more punctuations being added as described above with reference to FIG. 1.

The computer-implemented method 800 includes generating, at 806, feature vectors for the first lossy converted documents. The feature vectors include structure features of the first lossy converted documents. For example, the feature vectors may correspond to the feature vectors 135 of FIG. 1, and the feature vectors may be generated by the feature vector generator 133 of FIG. 1 as described above with reference to FIG. 1. In some examples, the structure features include at least one of a line length, a number of line breaks, domain types in a line, data types in the line, line number in originating document, a sentence structure score, and features from a preceding line as described above with reference to FIG. 1.

The computer-implemented method 800 includes training, at 808, one or more models based on the structure features and the edit markers. For example, the one or more models may correspond to the one or more models 184 described above with reference to FIG. 1, and the one or more models may be trained using the trainer 154 of FIG. 1 as described above with reference to FIG. 1. In some examples, the one or more models include a single line model, such as the single line model described above with reference to FIG. 1. Additionally or alternatively, the one or more models may include a multi-line model that considers a sliding window of a plurality of lines. For example, the one or more models may include the multi-line model described above with reference to FIG. 1. Additionally or alternatively, the one or more models may include a model that considers blocked sections to determine a content structure for different portions of an input document. For example, the one or more models may include the content model described above with reference to FIG. 1.

The computer-implemented method 800 includes applying, at 810, the trained one or more models to second lossy converted documents to determine proposed structure edits. For example, the proposed structure edits may correspond to the proposed structure edits 182 described above with reference to FIG. 1, and the machine learning model 153 may determine the proposed structure edits as described above with reference to FIG. 1.

The computer-implemented method 800 includes transforming, at 812, the second lossy converted documents to second corrected documents by applying one or more of the proposed structure edits. For example, the second corrected documents may correspond to the second corrected documents 160 described above with reference to FIG. 1, and the second lossy converted documents may be transformed to second corrected documents by the document editor 186 of FIG. 1 as described above with reference to FIG. 1.

In some examples, the computer-implemented method 800 includes combining confidence values corresponding to proposed document edits from each of multiple models to determine combined confidence values. For example, the document editor 186 may receive confidence values 183 from the machine learning model 153 and determine the combined confidence values as described above with reference to FIG. 1. In these examples, the computer-implemented method 800 includes determining whether the combined confidence values satisfy a threshold. In these examples, the one or more proposed document edits correspond to proposed document edits associated with a combined confidence value that satisfies the threshold. Thus, in these examples, only proposed document edits that have a combined confidence value that satisfies the threshold are applied to generate the second corrected documents.

Figure 9:
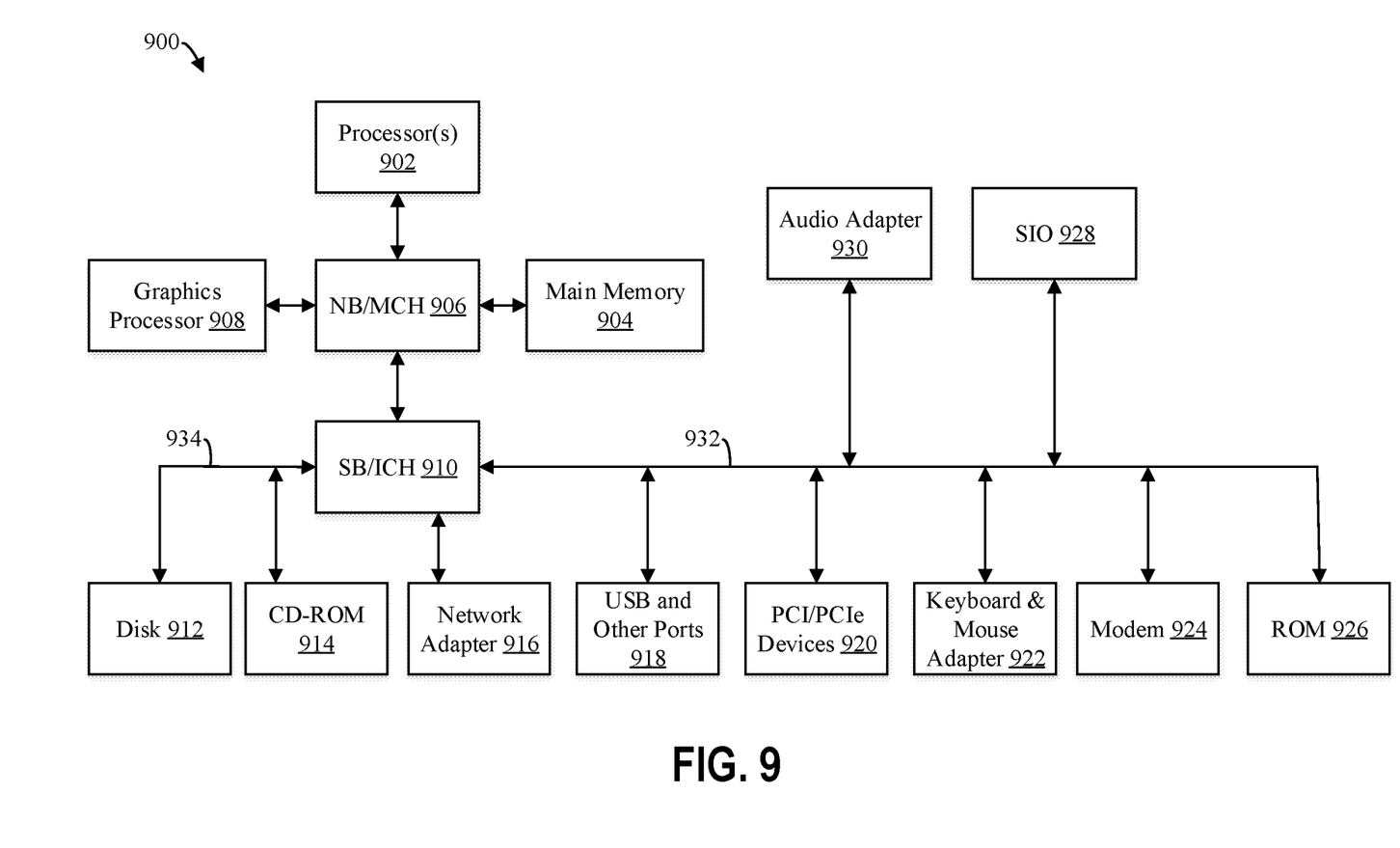
FIG. 9 shows an illustrative block diagram of an example data processing system that can be applied to implement embodiments of the present disclosure.

FIG. 9 is a block diagram of an example data processing system in which aspects of the illustrative embodiments may be implemented. Data processing system 900 is an example of a computer that can be applied to implement one or more components of the system 100 of FIG. 1 (e.g., the document editing sub-system 101 of FIG. 1) and in which computer usable code or instructions implementing the processes for illustrative embodiments of the present disclosure may be located. In one illustrative embodiment, FIG. 9 represents a computing device that implements the one or more components of the system 100 of FIG. 1 (e.g., the document editing sub-system 101 of FIG. 1) augmented to include the additional mechanisms of the illustrative embodiments described hereafter.

In the depicted example, data processing system 900 employs a hub architecture including north bridge and memory controller hub (NB/MCH) 906 and south bridge and input/output (I/O) controller hub (SB/ICH) 910. Processor(s) 902, main memory 904, and graphics processor 908 are connected to NB/MCH 906. Graphics processor 908 may be connected to NB/MCH 906 through an accelerated graphics port (AGP).

In the depicted example, local area network (LAN) adapter 916 connects to SB/ICH 910. Audio adapter 930, keyboard and mouse adapter 922, modem 924, ROM 926, hard disk drive (HDD) 912, CD-ROM drive 914, universal serial bus (USB) ports and other communication ports 918, and peripheral component interconnect (PCI) or PCI Express (PCIe) devices 920 connect to SB/ICH 910 through bus 932 and bus 934. PCI/PCIe devices 920 may include, for example, Ethernet adapters, add-in cards, and personal computer (PC) cards for notebook computers. PCI uses a card bus controller, while PCIe does not. ROM 926 may be, for example, a flash basic input/output system (BIOS).

HDD 912 and CD-ROM drive 914 connect to SB/ICH 910 through bus 934. HDD 912 and CD-ROM drive 914 may use, for example, an integrated drive electronics (IDE) or serial advanced technology attachment (SATA) interface. Super I/O (SIO) device 928 may be connected to SB/ICH 910.

An operating system runs on processor(s) 902. The operating system coordinates and provides control of various components within the data processing system 900 in FIG. 9. In some embodiments, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 900.

In some embodiments, data processing system 900 may be, for example, an IBM® eServer™ System p® computer system, running the Advanced Interactive Executive (AIX®) operating system or the LINUX® operating system. Data processing system 900 may be a symmetric multiprocessor (SMP) system including a plurality of processors 902. Alternatively, a single processor system may be employed.

Instructions for the operating system, the object-oriented programming system, and applications or programs are located on storage devices, such as HDD 912, and may be loaded into main memory 904 for execution by processor(s) 902. The processes for illustrative embodiments of the present disclosure may be performed by processor(s) 902 using computer usable program code, which may be located in a memory such as, for example, main memory 904, ROM 926, or in one or more peripheral devices 912 and 914, for example.

A bus system, such as bus 932 or bus 934 as shown in FIG. 9, may include one or more buses. The bus system may be implemented using any type of communication fabric or architecture that provides for a transfer of data between different components or devices attached to the fabric or architecture. A communication unit, such as modem 924 or network adapter 916 of FIG. 9, may include one or more devices used to transmit and receive data. A memory may be, for example, main memory 904, ROM 926, or a cache such as found in NB/MCH 906 in FIG. 9.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read only memory (ROM), an erasable programmable read-only memory (EPROM) or Flash memory, a static random access memory (SRAM), a portable compact-disc read only memory (CD-ROM), a digital video disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or eternal storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving first lossy converted documents, wherein the first lossy converted documents are structured documents in which at least some structure of source documents from which the first lossy converted documents are generated has been lost;
generating corrected documents for the first lossy converted documents, wherein each of the corrected documents includes edit markers that are based on training input from an operator of a training device and that reflect structure changes in the corrected document relative to structure in a corresponding document of the first lossy converted documents, and wherein the structure changes include removal of at least some of the structure in the corresponding document;
generating feature vectors for the first lossy converted documents, wherein the feature vectors include structure features of the first lossy converted documents;
comparing first proposed structure edits determined by one or more models based on the feature vectors to structure edits corresponding to the edit markers to determine training data;
training the one or more models based on the training data;
subsequent to training the one or more models, applying the one or more models to second lossy converted documents to determine second proposed structure edits, wherein the second lossy converted documents are structured documents in which at least some structure of source documents from which the second lossy converted documents are generated has been lost; and
transforming the second lossy converted documents to generate second corrected documents by applying one or more of the second proposed structure edits.

2. The computer-implemented method of claim 1, wherein the structure changes are an addition of one or more line breaks, an addition of one or more section headers, or an addition of one or more punctuations.

3. The computer-implemented method of claim 1, wherein the one or more models include a multi-line model that considers a sliding window of a plurality of lines, wherein the first lossy converted documents are generated by performing optical character recognition on first digital documents, and wherein the second lossy converted documents are generated by performing optical character recognition on third digital documents.

4. The computer-implemented method of claim 1, wherein the one or more models include a model that considers document sections to determine a content structure for different portions of an input document.

5. The computer-implemented method of claim 1, wherein the edit markers include at least one of addition of a line break, removal of a line break, addition of a section header, or addition of one or more punctuations.

6. The computer-implemented method of claim 1, wherein the structure features include at least one of a line length, a number of line breaks, domain types in a line, data types in the line, line number in a source document, a sentence structure score, and features from a preceding line.

7. The computer-implemented method of claim 1, wherein the one or more models include multiple models, and further comprising:
combining confidence values corresponding to proposed document edits from each of the multiple models to determine combined confidence values; and
determining whether the combined confidence values satisfy a threshold, and
wherein the one or more of the proposed document edits correspond to proposed document edits associated with a combined confidence value that satisfies the threshold.

8. A non-transitory computer readable storage media storing instructions that, when executed by a computer, cause the computer to:
receive first lossy converted documents, wherein the first lossy converted documents are structured documents in which at least some structure of source documents from which the first lossy converted documents are generated has been lost;
generate corrected documents for the first lossy converted documents, wherein each of the corrected documents includes edit markers that are based on training input from an operator of a training device and that reflect structure changes in the corrected document relative to a corresponding document of the first lossy converted documents, and wherein the structure changes include removal of at least some of the structure in the corresponding document;
generate feature vectors for the first lossy converted documents, wherein the feature vectors include structure features of the first lossy converted documents;
compare first proposed structure edits determined by one or more models based on the feature vectors to structure edits corresponding to the edit markers to determine training data;
train the one or more models based on the training data;
subsequent to training the one or more models, apply the one or more models to second lossy converted documents to determine second proposed structure edits, wherein the second lossy converted documents are structured documents in which at least some structure of source documents from which the second lossy converted documents are generated has been lost; and
transform the second lossy converted documents to generate second corrected documents by applying one or more of the second proposed structure edits.

9. The non-transitory computer readable storage media of claim 8, wherein the structure changes are an addition of one or more line breaks, an addition of one or more paragraph breaks, an addition of one or more section headers, or an addition of one or more punctuations.

10. The non-transitory computer readable storage media of claim 8, wherein the one or more models include a multi-line model that considers a sliding window of a plurality of lines.

11. The non-transitory computer readable storage media of claim 8, wherein the one or more models include a model that considers document sections to determine a content structure for different portions of an input document.

12. The non-transitory computer readable storage media of claim 8, wherein the edit markers include at least one of addition of a line break, removal of a line break, addition of a section header, or addition of one or more punctuations.

13. The non-transitory computer readable storage media of claim 8, wherein the structure features include at least one of a line length, a number of line breaks, domain types in a line, data types in the line, line number in a source document, a sentence structure score, and features from a preceding line.

14. The non-transitory computer readable storage media of claim 8, wherein the one or more models include multiple models, wherein the instructions further cause the computer to:
combine confidence values corresponding to proposed document edits from each of the multiple models to determine combined confidence values; and
determine whether the combined confidence values satisfy a threshold, and
wherein the one or more of the proposed document edits correspond to proposed document edits associated with a combined confidence value that satisfies the threshold.

15. A computer system, comprising:
memory storing program instructions; and
a processor coupled to the memory and configured to execute the program instructions stored on the memory to cause the processor to:
receive first lossy converted documents, wherein the first lossy converted documents are structured documents in which at least some structure of source documents from which the first lossy converted documents are generated has been lost;
generate corrected documents for the first lossy converted documents, wherein each of the corrected documents includes edit markers that are based on training input from an operator of a training device and that reflect structure changes in the corrected document relative to a corresponding document of the first lossy converted documents, and wherein the structure changes include removal of at least some of the structure in the corresponding document;
generate feature vectors for the first lossy converted documents, wherein the feature vectors include structure features of the first lossy converted documents;
compare first proposed structure edits determined by one or more models based on the feature vectors to structure edits corresponding to the edit markers to determine training data;
train one or more models based on the training data;
subsequent to training the one or more models, apply the one or more models to second lossy converted documents to determine second proposed structure edits, wherein the second lossy converted documents are structured documents in which at least some structure of source documents from which the second lossy converted documents are generated has been lost; and
transform the second lossy converted documents to generate second corrected documents by applying one or more of the second proposed structure edits.

16. The computer system of claim 15, wherein the structure changes are an addition of one or more line breaks, addition of one or more paragraph breaks, addition of one or more section headers, or addition of one or more punctuations.

17. The computer system of claim 15, wherein the one or more models include a multi-line model that considers a sliding window of a plurality of lines.

18. The computer system of claim 15, wherein the one or more models include a model that considers document sections to determine a content structure for different portions of an input document.

19. The computer system of claim 15, wherein the edit markers include at least one of addition of a line break, removal of a line break, addition of a section header, or addition of one or more punctuations.

20. The computer system of claim 15, wherein the structure features include at least one of a line length, a number of line breaks, domain types in a line, data types in the line, line number in a source document, a sentence structure score, and features from a preceding line.

* * * * *